March 20, 1934. F. K. WING 1,951,462
SCRAPING MEANS FOR SEWAGE DISPOSAL PLANTS
Filed June 11, 1932 2 Sheets-Sheet 1
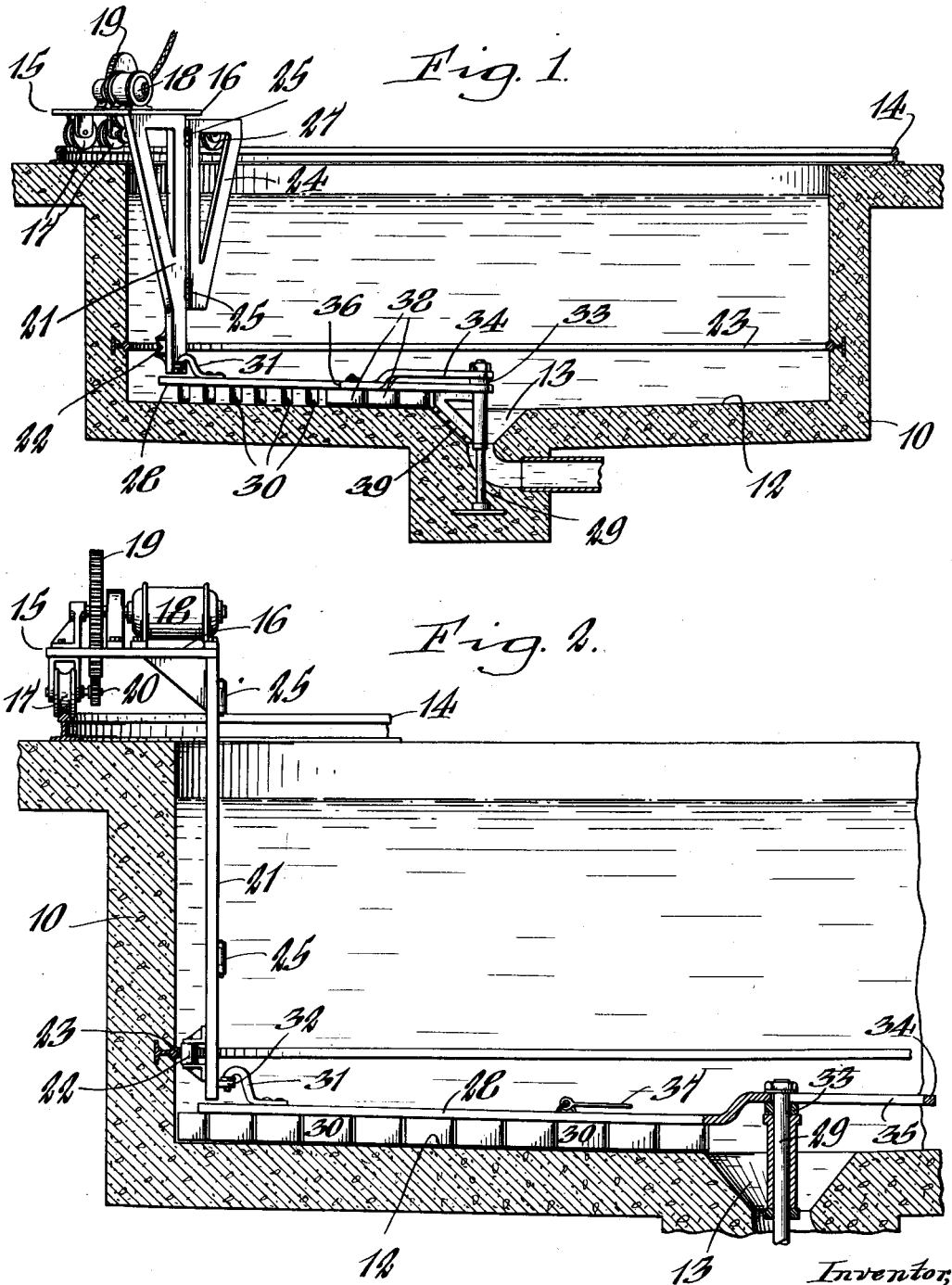

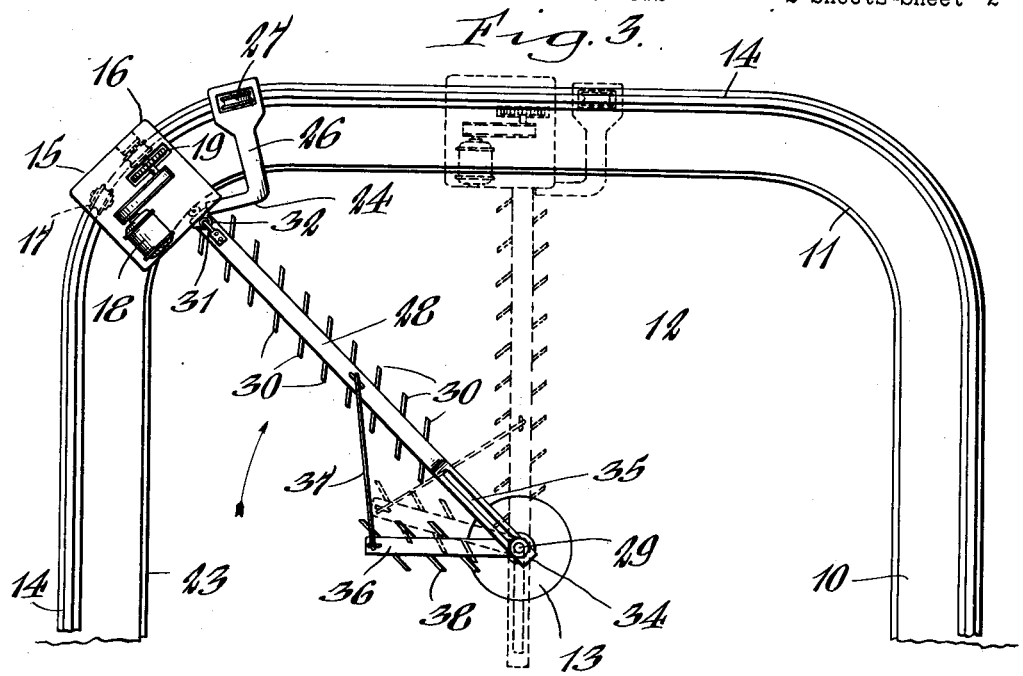

Patented Mar. 20, 1934

1,951,462

UNITED STATES PATENT OFFICE 1,951,462

SCRAPING MEANS FOR SEWAGE DISPOSAL PLANTS

Frederick K. Wing, Buffalo, N. Y.

Application June 11, 1932, Serial No. 616,666

9 Claims. (Cl. 210—55)

This invention relates generally to improvements in sewage disposal apparatus and particularly to the scraping means employed for removing the sludge or sediment from the bottom of the settling or sedimentation tanks of such apparatus.

One of its objects is the provision of a rotatable scraping means of this character which is so designed and constructed as to effectually scrape and remove the sludge from the bottom of the settling tank, which is supported at its opposite ends substantially centrally and circumferentially of the tank, and which is propelled or revolved from a point along the perimeter of the tank.

Another object of the invention is to provide a sludge-removing mechanism for sewage disposal tanks which is mounted for combined rotatable and transverse or radial movement relative to the tank-bottom to adapt it to any varying radial dimensions which exist between the center of the tank and its periphery, whereby the sludge-removing mechanism operates over the entire surface of the tank-floor.

A still further object of the invention is to provide a revolving scraping mechanism of this character which is simple, compact and inexpensive in construction, which is reliable and efficient in operation, and whose scraping elements are disposed to effectually scrape the entire bottom surface of the tank.

Other features of the invention reside in the particular construction and arrangement of parts hereinafter described and particularly pointed out in the appended claims.

In the accompanying drawings:—Figure 1 is a cross section of a sewage disposal tank showing my improved scraping mechanism associated therewith, the same being positioned adjoining one of the rounded corners of the tank. Figure 2 is an enlarged fragmentary section, similar to Figure 1, but showing the straight sides of the tank. Figure 3 is a top plan view of the scraping mechanism. Figure 4 is a fragmentary top plan view of the scraper element showing different blade arrangement. Figure 5 is a fragmentary cross section of a modified form of settling tank and showing my invention in connection therewith.

Similar characters of reference indicate corresponding parts throughout the several views.

By way of example, I have shown my invention in connection with a sedimentation tank 10 of a sewage disposal plant, this tank being rectangular in plan and having rounded corners 11. In the form of the tank shown in Figures 1, 2 and 3, its bottom 12 slopes toward the center thereof where it is provided with a discharge hopper 13 for conducting the sludge or settled matter to a suitable point of discharge.

In its general organization, the improved scraping mechanism comprises a scraper revolvably mounted in the bottom of the tank and supported at one end at the center of the tank and at its opposite end adjoining the side wall of the tank; a traveling carriage guided on the top side of the tank along its marginal edge for movement along the perimeter thereof and having means depending therefrom into the tank for supporting the adjoining outer end of the scraper in a relatively fixed position to the wall of the tank, whereby such end of the scraper is adapted to follow a path of travel defined by the tank-wall while its inner end is free to move laterally or radially relatively to the axis about which the scraper revolves to permit the scraper to automatically shift its position in traveling along the straight sides and past the rounded corners of the tank; and auxiliary scraping means revolvable immediately about the center of the tank to scrape the bottom thereof during those times that the main scraper is traveling about the rounded corners of the tank.

Mounted on the top side of the tank along the marginal edge thereof and following the contour of the same, is a rail or track 14 on which a truck or carriage, indicated generally by the numeral 15, is adapted to travel at a comparatively slow speed. This carriage may be of any suitable and appropriate construction, but preferably consists of a platform 16 having guide wheels 17 journaled thereon for engagement with the track 14. Mounted on the top side of this platform is an electric motor 18 connected by suitable reduction gearing 19 to the driven shaft 20 of one of the wheels 17, the motor being connected to the source of power by a flexible conductor or cable or other appropriate connecting medium. Depending from the carriage platform into the tank, and disposed adjacent its vertical wall, is an upright scraper-supporting frame 21, which, as shown in Figure 2, is substantially parallel to such tank-wall and terminates at its lower end short of the bottom of the tank. At the inner side of its lower end, this frame has a guide or thrust bearing roller 22 thereon engaging a guide rail or track 23 partially embedded or otherwise anchored in the side wall of the tank and extending completely around the same. The tracks 14 and 23 and companion guide wheels or rollers 17 and 23, respectively, are disposed substantially at right angles to each other to effectually support the carriage in position while traveling about the tank.

Projecting from the forward or leading end of the carriage is a bracing or stabilizing means therefor which consists of a frame 24 hinged at 25 to the scraper supporting frame 21 to swing toward and from the side of the tank as the carriage rounds the corners of the tank. At its upper end, this stabilizing frame has an inwardly-facing extension 26 overhanging the marginal top side of the tank and having a guide wheel 27 thereon engaging the track 14.

The scraper, which is adapted to travel over the floor or bottom of the tank 10 for directing the sludge or sediment into the discharge hopper 13, preferably consists of a substantially horizontally-disposed arm or beam 28 supported at its outer end on the lower end of the carriage frame 21 and at its inner end centrally of the tank on an upright king-pin or stationary post 29 which may be embedded or otherwise anchored in the bottom of the tank and which, as shown in Figures 1, 2 and 3, is disposed axially of the discharge hopper 13. At its underside, this scraper arm has suitable obliquely disposed scraping blades 30 which serve to remove and direct the sludge toward the center of the tank into the discharge hopper as the same is revolved over the bottom of the tank by the carriage 15. This scraper arm is hung or suspended at its outer end from the depending scraper frame 21 of the carriage and for this purpose is provided with a hook-like fitting or connection 31 which engages a corresponding apertured lug 32 on said frame for permitting a relative pivotal action between these parts, as when the scraper is passing the rounded corners of the tanks. The inner end of the scraper-arm 28 is supported on the king-pin 29 through the medium of a collar 33 and this king-pin constitutes a fixed pivot about which the scraper-arm is not only adapted to revolve but relative to which said arm is adapted to move longitudinally and radially as a result of the scraper traveling along the straight sides and rounded corners of the tank 10, the outer end of the scraper assuming a relatively fixed position relative to the tank-wall and following the same during the movement of the scraper. The inner end 34 of the scraper-arm is preferably offset vertically relatively to its remaining portion and contains a longitudinal slot 35 through which the king-pin extends and whereby the longitudinal movement of the scraper-arm is permitted, the arm shifting radially outward while traversing the curved corners of the tank and shifting radially inward when assuming positions alongside the straight portions of the tank. By offsetting the slotted portion of the scraper-arm in the manner shown in Figure 2, the same is held clear and free from contact with these portions of the tank bottom surrounding the discharge hopper 13. The depth or height of the scraper-beam supports is such as to maintain the beam in a stable position to insure uniform scraping.

The scraper blades 30 preferably terminate short of the offset slotted portion 34 of the arm 28, and in order to take care of the removal of the sludge immediately surrounding the discharge hopper 13 during the time the scraper-arm is radially extended when traversing the corner portions of the tank, as shown in Figure 3, I provide an auxiliary scraper consisting of a comparatively short arm 36 supported at its inner end on the king-pin 29 to revolve about the same in accordance with the movement of the main scraper arm 28 and connected at its outer end by a link 37 with the main scraper-arm. On its under side this auxiliary arm 36 has scraper blades 38 which extend over that area of the tank-bottom immediately surrounding the discharge hopper 13 to remove the sludge therefrom when the main scraper-arm is projected into corner-engaging positions, as seen in Figure 3. During the movement of the main scraper along the straight sides of the tank, the auxiliary scraper 36 simply follows along with it in an obvious manner, the linkage connection between the arm 28 and the auxiliary arm 26 controlling the relative movement of the latter.

If desired, a scraper may be provided for traversing the sloping walls of the discharge hopper 13, and to this end, as shown in Figure 1, I provide a scraper 39 which may constitute a part of or be carried by the auxiliary scraper-arm 36 and revolve therewith in accordance with the movement of the main scraper 28 over the bottom wall of the tank.

Instead of providing the auxiliary scraping arm 36 to take care of the removal of the sludge immediately surrounding the discharge hopper 13, the inner end of the main scraping arm 28 may be provided with blades 38$^a$ which are disposed in two rows at opposite sides of the arm-slot 35 in oblique or staggered relation.

In the modified form of the invention shown in Figure 4, the tank 40 has its bottom wall 41 sloping outwardly with the discharge hopper 42 disposed adjacent the tank wall. Otherwise, the scraper mechanism is the same as that previously described and the blades are disposed at the proper angle to direct the sludge outwardly into the discharge hopper. In this case, the slotted portion 34 of the scraper-arm 28 may be straight instead of offset.

The present invention, while manifestly simple, compact and inexpensive in construction, is efficient and reliable in operation, affording a complete scraping of the tank-floor, and by dispensing with the customary bridge structure heretofore commonly employed with sewage disposal apparatus of this character, the structure is materially reduced in weight and requires but a minimum expenditure of power to operate it.

I claim as my invention:—

1. In an apparatus of the character described, the combination of a tank, rotating scraping means disposed in the bottom of the tank and terminating a substantial distance below its top, means located substantially centrally of said tank for supporting the inner end of the scraping means and about which the latter is revolvable, and motion transmitting means guided for movement about the perimeter of the tank and having an upright part pivoted to said scraping means and disposed within the tank adjoining its side wall and constituting a support and a driving connection for the outer end of the scraping means, the latter and its supporting part forming an L-shaped connection between said movable means and the centrally-located means about which said scraping means revolves.

2. In an apparatus of the character described, the combination of a tank, a fixed pivot disposed substantially centrally of the tank-bottom, a movable means guided for movement about the sides of the tank and having a portion extending downwardly therefrom and adjoining the side wall of the tank and a scraping means disposed in the bottom of the tank and slidingly and pivotally connected at its inner end to said pivot and pivotally connected at its outer end to the downwardly-extending portion of said movable means.

3. In an apparatus of the character described, the combination of a substantially rectangular tank having rounded corners, a pivot member disposed substantially centrally of the tank-bottom, a movable member guided for movement about the sides and rounded corners of the tank, and a scraping means overlying the bottom of the tank radially of said pivot member for revolving about the same and having a radial slot at its inner end engaging the pivot member, the opposite end of said scraping means being supported on said movable member and having a pivotal connection therewith.

4. In an apparatus of the character described, the combination of a tank, a pivot member disposed substantially centrally of the tank-bottom, a carriage guided for movement about the perimeter of the tank and having a part depending into the tank adjacent its side wall, a guide rail extending about the side wall of the tank and against which said pendant carriage-part is adapted to bear, and a scraping means disposed in the bottom of the tank and supported at one end on said pivot for rotary movement about the same and at its other end on said pendant carriage-part.

5. In an apparatus of the character described, the combination of a tank, a scraper revolvably mounted in the bottom of the tank, and means for revolving said scraper including a carriage guided for movement about the marginal top side of the tank and having a part depending into the tank adjacent its side wall to form an L with the scraper, and pivotally connected to the outer end of said scraper.

6. In an apparatus of the character described, the combination of a tank, a track extending around the marginal top side of the tank, a carriage guided on said track and having a frame member depending into the tank alongside its side wall, a scraper revolvable over the bottom of the tank and connected at its outer end to said pendant carriage-member, and an auxiliary frame member hinged to said first-named frame member to swing toward and from the tank-wall and having a guide element thereon engaging said track.

7. In an apparatus of the character described, the combination of a tank, a stationary supporting member disposed substantially centrally of the tank and terminating at a point immediately above the tank bottom, a movable member guided for movement about the perimeter of the tank, a main scraping means in the tank-bottom supported at its ends on said members, respectively, said scraping means being movable over the bottom of the tank by said movable member and about the axis of said stationary member, and auxiliary scraping means disposed adjacent to the center of the tank and slidingly connected to said main scraping means to move therewith in a circular path over the tank-bottom.

8. In an apparatus of the character described, the combination of a tank, a stationary supporting member disposed substantially centrally of the tank, a movable member guided for movement about the perimeter of the tank, a main scraping means in the tank-bottom supported at its ends on said members, respectively, said scraping means being movable over the bottom of the tank by said movable member and about the axis of said stationary member, and auxiliary scraping means disposed adjacent to the center of the tank in adjoining relation to the main scraping means to move therewith and pivoted at its inner end to said stationary support and link-connected at its outer end to said main scraping means.

9. In an apparatus of the character described, the combination of a tank having a central discharge hopper, a stationary supporting member disposed axially of said hopper, a main scraper fulcrumed at its inner end on said supporting member to revolve over the bottom of the tank and direct any sediment to said hopper, movable means guided at the periphery of the tank and connected to the outer end of said scraper for actuating it, and an arm disposed in adjoining relation to the inner end of said scraper and fulcrumed at one end on said supporting member and link-connected at its other end to said scraper, said arm having a scraping blade depending therefrom in contacting relation with the wall of said hopper.

FREDERICK K. WING.

wall of the tank and a scraping means disposed in the bottom of the tank and slidingly and pivotally connected at its inner end to said pivot and pivotally connected at its outer end to the downwardly-extending portion of said movable means.

3. In an apparatus of the character described, the combination of a substantially rectangular tank having rounded corners, a pivot member disposed substantially centrally of the tank-bottom, a movable member guided for movement about the sides and rounded corners of the tank, and a scraping means overlying the bottom of the tank radially of said pivot member for revolving about the same and having a radial slot at its inner end engaging the pivot member, the opposite end of said scraping means being supported on said movable member and having a pivotal connection therewith.

4. In an apparatus of the character described, the combination of a tank, a pivot member disposed substantially centrally of the tank-bottom, a carriage guided for movement about the perimeter of the tank and having a part depending into the tank adjacent its side wall, a guide rail extending about the side wall of the tank and against which said pendant carriage-part is adapted to bear, and a scraping means disposed in the bottom of the tank and supported at one end on said pivot for rotary movement about the same and at its other end on said pendant carriage-part.

5. In an apparatus of the character described, the combination of a tank, a scraper revolvably mounted in the bottom of the tank, and means for revolving said scraper including a carriage guided for movement about the marginal top side of the tank and having a part depending into the tank adjacent its side wall to form an L with the scraper, and pivotally connected to the outer end of said scraper.

6. In an apparatus of the character described, the combination of a tank, a track extending around the marginal top side of the tank, a carriage guided on said track and having a frame member depending into the tank alongside its side wall, a scraper revolvable over the bottom of the tank and connected at its outer end to said pendant carriage-member, and an auxiliary frame member hinged to said first-named frame member to swing toward and from the tank-wall and having a guide element thereon engaging said track.

7. In an apparatus of the character described, the combination of a tank, a stationary supporting member disposed substantially centrally of the tank and terminating at a point immediately above the tank bottom, a movable member guided for movement about the perimeter of the tank, a main scraping means in the tank-bottom supported at its ends on said members, respectively, said scraping means being movable over the bottom of the tank by said movable member and about the axis of said stationary member, and auxiliary scraping means disposed adjacent to the center of the tank and slidingly connected to said main scraping means to move therewith in a circular path over the tank-bottom.

8. In an apparatus of the character described, the combination of a tank, a stationary supporting member disposed substantially centrally of the tank, a movable member guided for movement about the perimeter of the tank, a main scraping means in the tank-bottom supported at its ends on said members, respectively, said scraping means being movable over the bottom of the tank by said movable member and about the axis of said stationary member, and auxiliary scraping means disposed adjacent to the center of the tank in adjoining relation to the main scraping means to move therewith and pivoted at its inner end to said stationary support and link-connected at its outer end to said main scraping means.

9. In an apparatus of the character described, the combination of a tank having a central discharge hopper, a stationary supporting member disposed axially of said hopper, a main scraper fulcrumed at its inner end on said supporting member to revolve over the bottom of the tank and direct any sediment to said hopper, movable means guided at the periphery of the tank and connected to the outer end of said scraper for actuating it, and an arm disposed in adjoining relation to the inner end of said scraper and fulcrumed at one end on said supporting member and link-connected at its other end to said scraper, said arm having a scraping blade depending therefrom in contacting relation with the wall of said hopper.

FREDERICK K. WING.

CERTIFICATE OF CORRECTION.

Patent No. 1,951,462.　　　　　　　　　　　　　　　　March 20, 1934.

FREDERICK K. WING.

It is hereby certified that error appears in the printed specification of the above numbered patent requiring correction as follows: Page 2, line 130, claim 1, after the word "tank" insert a comma; and lines 130 and 131, strike out the words and comma "and terminating a substantial distance below its top,"; line 132, after "tank" insert and terminating a substantial distance below its top,; and that the said Letters Patent should be read with these corrections therein that the same may conform to the record of the case in the Patent Office.

Signed and sealed this 24th day of April, A. D. 1934.

Bryan M. Battey (Seal)　　　　　　　　　　　　　　　　Acting Commissioner of Patents.